United States Patent [19]

Burgdorf et al.

[11] 4,136,761
[45] Jan. 30, 1979

[54] SPOT-TYPE DISC BRAKE

[75] Inventors: Jochen Burgdorf, Offenbach; Roberto Stoka, Frankfurt, both of Fed. Rep. of Germany

[73] Assignee: ITT Industries, Inc., New York, N.Y.

[21] Appl. No.: 867,247

[22] Filed: Jan. 5, 1978

Related U.S. Application Data

[63] Continuation of Ser. No. 758,100, Jan. 10, 1971, abandoned, which is a continuation of Ser. No. 640,131, Dec. 12, 1975, abandoned, which is a continuation of Ser. No. 539,149, Jan. 7, 1975, abandoned.

[30] Foreign Application Priority Data

Feb. 22, 1974 [DE] Fed. Rep. of Germany ....... 2408519

[51] Int. Cl.² ............................................. F16D 65/02
[52] U.S. Cl. .................................. 188/73.3; 188/73.5
[58] Field of Search ................... 188/73.3, 73.4, 73.5, 188/72.4, 72.5

[56] References Cited

U.S. PATENT DOCUMENTS

| | | | |
|---|---|---|---|
| 3,421,602 | 1/1969 | Craske | 188/73.4 |
| 3,625,314 | 12/1971 | Rinker | 188/73.3 |
| 3,841,445 | 10/1974 | Rinker | 188/73.5 |
| 3,913,709 | 10/1975 | Burgdorf et al. | 188/73.4 |
| 3,990,545 | 11/1976 | Hoffmann et al. | 188/73.3 |

Primary Examiner—George E. A. Halvosa
Attorney, Agent, or Firm—John T. O'Halloran; Alfred C. Hill

[57] ABSTRACT

A sliding guide arrangement to permit a brake caliper to slide relative to a fixed brake carrier. The arrangement includes a first pair of sliding guide members on one side of the brake disc axis and a second pair of sliding guide members on the other side of the brake disc axis. Each pair of guide members include caliper guide surfaces and brake carrier guide surfaces. The caliper guide surfaces are provided by surfaces of a rib portion or groove formed therein and the brake carrier guide surfaces are provided by prismatic pilots engaging the caliper groove. A spring is provided in contact with the carrier and the brake cylinder carried by the caliper to keep the guiding surfaces of the caliper and brake carrier in abutment with each other.

9 Claims, 5 Drawing Figures

SPOT-TYPE DISC BRAKE

CROSS-REFERENCE TO RELATED APPLICATIONS

This is a continuation of application Ser. No. 758,100, filed Jan. 10, 1977, now abandoned which is a continuation of application Ser. No. 640,131, filed Dec. 12, 1975, now abandoned, which is a continuation application of Ser. No. 539,149, filed Jan. 7, 1975, now abandoned.

BACKGROUND OF THE INVENTION

This invention relates to spot-type disc brakes and more particularly to a sliding guide arrangement for floating-caliper spot-type disc brakes.

In floating-caliper spot-type disc brakes, there exists the problem of providing a movable guiding arrangement for the brake caliper at the fixed brake carrier, which, in order to achieve a high degree of efficiency, must have easy motion and be insusceptible to jamming even when subjected to loads, must not be impaired either by corrosion or by dirt, and must have no tendency to chatter and rattle under the impact of shocks and vibrations.

In a spot-type disc brake known from the U.S. Pat. No. 3,616,879, which has a brake caliper slidably guided in a central opening of a brake carrier which straddles the brake disc, the brake carrier is provided with V-shaped grooves aligned parallel to the axis of the brake disc for engagement with corresponding projections from the brake-caliper section straddling the brake disc. Thus, the guiding arrangement consists of two prisms aligned parallel to each other and therefore is statically undefined. In order to reduce the tendency of jamming employing this known guiding arrangement and to compensate for variations in manufacturing tolerances, leaf-spring elements are installed between the guiding element of the brake carrier and the guiding element of the brake caliper. The functioning capability of the guiding arrangement is therefore largely dependent on the durability of these spring elements. In addition to this, the springs are required to generate a relatively high biassing force to be able to absorb the forces of inertia occurring during shocks. A further disadvantage of this known design lies in the fact that the contact faces between the sliding portions are relatively large so that the guiding arrangement may jam more readily due to corrosion.

SUMMARY OF THE INVENTION

It is the object of the present invention to provide a spot-type disc brake of the floating-caliper type wherein the brake caliper is connected with the brake carrier by a statically defined sliding guide arrangement which is easy to manufacture and overcomes the above-mentioned disadvantages of the known prior art guiding arrangement.

A feature of the present invention is the provision of a spot-type disc brake comprising a rotating brake disc having an axis of rotation; a fixed brake carrier to receive brake torque embracing the disc; a first brake shoe disposed on one side of the disc; a second brake shoe disposed on the other side of the disc; a brake actuating device disposed on the one side of the disc in engagement with the first brake shoe; a brake caliper straddling an edge of the disc and supporting the actuating device and the second brake shoe to actuate the second brake shoe to brake the disc when the actuating device actuates the first brake shoe to brake the disc; a first pair of guide members connected to the caliper spaced along and in one direction from the axis; a second pair of guide members connected to the carrier spaced along and in the one direction from the axis, each of the second pair of guide members engaging a different one of the first pair of guide members; a third pair of guide members connected to the caliper spaced along and in a direction opposite the one direction from the axis; a fourth pair of guide members connected to the carrier spaced along and in the direction opposite the one direction from the axis, each of the fourth pair of guide members engaging a different one of the third pair of guide members; a first pair of engagement points formed by first guide surfaces of each of the first pair of guide members and second guide surfaces of an associated one of each of the second pair of guide members; a second pair of engagement points formed by third guide surfaces of each of the third pair of guide members and fourth guide surfaces of an associated one of each of the fourth pair of guide members; each of the first, second, third and fourth guide surfaces being radially and tangentially aligned with the disc; a third pair of engagement points formed by fifth guide surfaces of each of said first pair of guide members and sixth guide surfaces of an associated one of each of the second pair of guide members; a fourth pair of engagement points formed by seventh guide surfaces of each of the third pair of guide members and eighth guide surfaces of an associated one of each of the fourth pair of guide members; each of the fifth, sixth, seventh and eighth guiding surfaces being disposed essentially at an angle of 45 degrees with respect to an associated one of the first, second, third and fourth guiding surfaces; and resilient means engaging the carrier and the actuating device to keep associated ones of the guide surfaces in abutment with one another.

It is by virtue of the above-described guiding arrangement that automatic alignment of the brake caliper to the position of the guiding surfaces of the brake carrier is achieved, so that even deformations of the brake carrier under load will not cause jamming of the brake caliper.

Another feature of the present invention is that by the cooperative arrangement of the guiding arrangement elements permit a particularly space-saving and compact design in that the space requirements in the area between the disc-brake edge and the wheel rim are extremely small. Also, a disc brake which includes the features of this invention permits extremely economical manufacture.

Still another feature of the present invention is that an improvement of the abutment of the brake caliper to the brake carrier will be achieved if part of the circumferential forces are transmitted to the brake carrier via the brake caliper. This eliminates in particular the tendency of the brake to rattle during braking and avoids striking of the slidable parts against the brake carrier while the braking process is being initiated. A further feature of the present invention is that the engagement points between the caliper and brake carrier in the guiding arrangement of this invention permits a more even distribution of the stresses, strains and loads applied to the engaging surfaces of the guiding arrangement.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
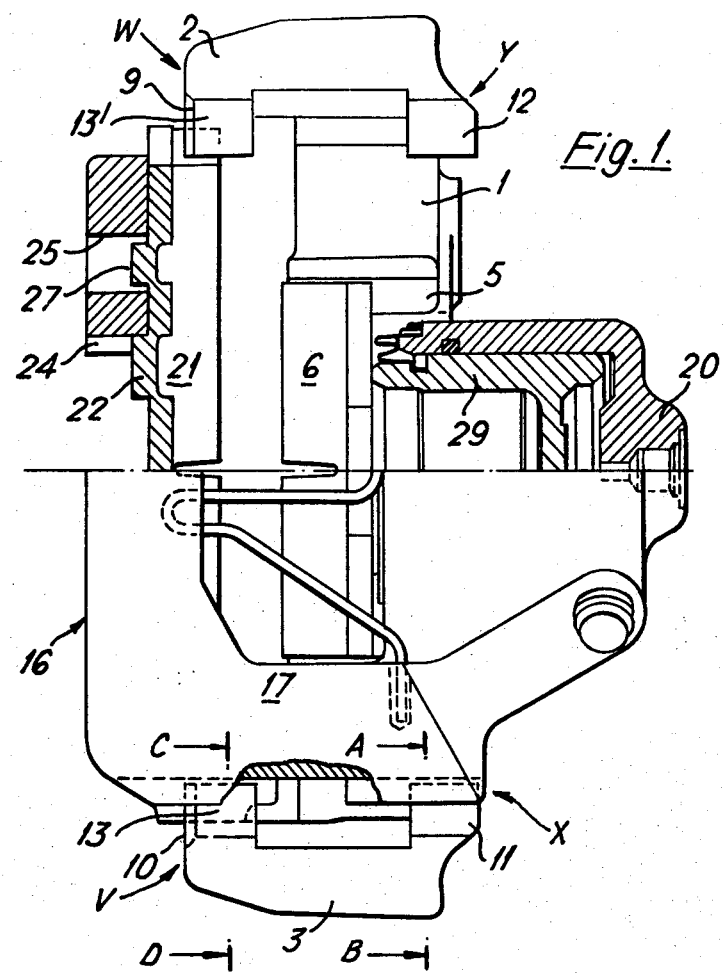
FIG. 1 is a partly sectioned top plan view of a spot-type brake in accordance with the principles of the present invention.
Figure 2:
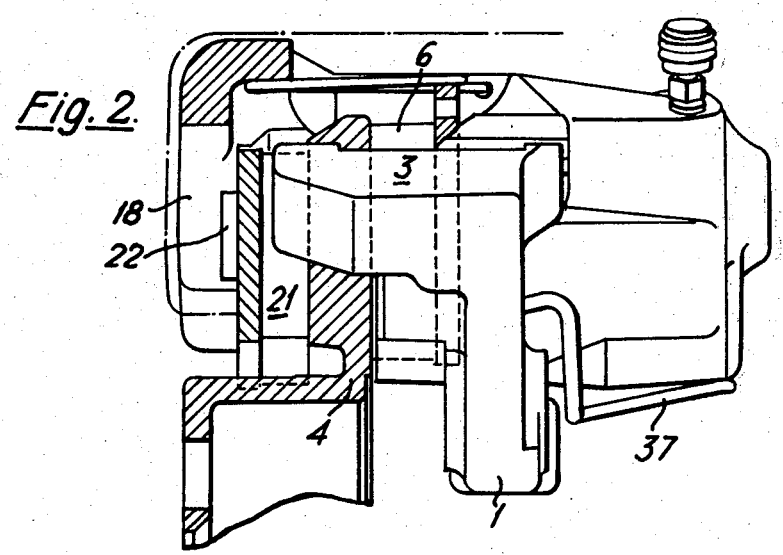
FIG. 2 is a partly sectioned side view of the brake of FIG. 1.
Figure 3:
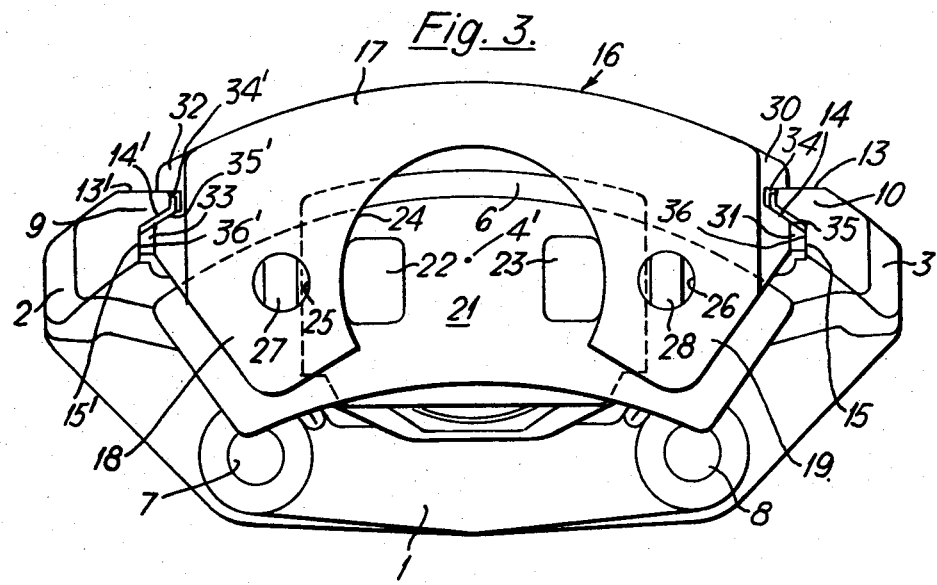
FIG. 3 is a front view of the brake of FIG. 1.
Figure 4:
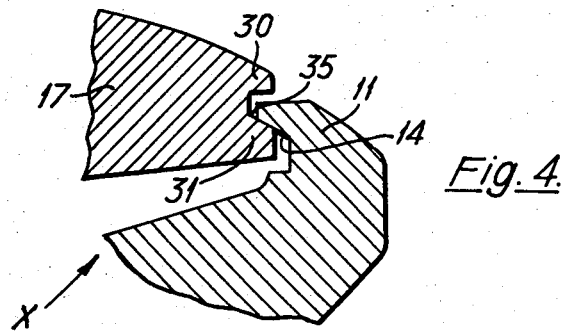
FIG. 4 is a partial sectional view taken along the line A-B of FIG. 1.
Figure 5:
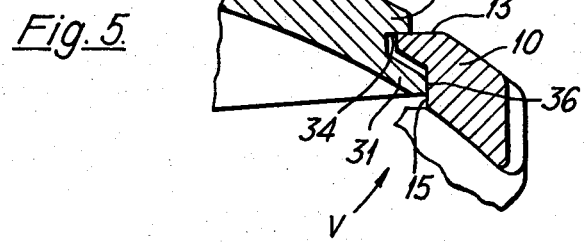
FIG. 5 is a partial sectional view taken along the line C-D of FIG. 1.

Referring to FIGS. 1-5, the brake shown includes a brake carrier 1 having two circumferentially spaced arms 2 and 3 which project over the brake disc 4. Brake carrier 1 is provided with a central opening 5 for slidably receiving and supporting a brake shoe 6. The holes 7 and 8 serve to fasten brake carrier 1 to a supporting member, for example, to the steering knuckle of a vehicle (not shown). At arms 2 and 3 of brake carrier 1, there are disposed guiding members consisting of prismatic guiding pilots 9, 10, 11 and 12 at which members guiding surfaces 13, 13', 14, 14', 15 and 15' are provided which are parallel to the brake-disc axis 4' and against which the brake caliper 16 abuts.

Brake caliper 16 includes a central portion 17 having essentially the shape of a rectangle cut out of a cylinder wall, two legs 18 and 19 arranged parallel to brake disc 4, and the brake cylinder 20. Central portion 17, legs 18 and 19, and brake cylinder 20 are preferably an integral casting. Legs 18 and 19 support the brake shoe 21 which in a circumferential direction relative the brake disc 4 is supported by means of projections 22 and 23 in a bore 24 formed by legs 18 and 19 and coaxial to brake cylinder 20. Further projections 27 and 28 at brake shoe 21 which extend into bores 25 and 28 in legs 18 and 19 serve to secure brake shoe 21 against torsion. A piston 29 which is disposed in brake cylinder 20 directly acts on brake shoe 6 to urge it into frictional engagement with brake disc 4. The counterforce is transmitted from brake caliper 16 to brake shoe 21, brake caliper 16 being shifted until brake shoe 21 likewise is in frictional engagement with brake disc 4.

The guiding members of brake caliper 16 includes ribs 30 and 31 and ribs 32 and 33, respectively, which are arranged on either side of central portion 17. The ribs are formed by trapezoidal grooves provided in the side faces of central portion 17. At the ribs, guiding surfaces 34, 34', 35, 35', 36 and 36' are provided cooperating with the guiding surfaces at brake carrier 1. Guiding surfaces 34 and 34' lie in a common plane tangentially aligned with respect to brake disc 4 and are in engagement with the correspondingly aligned guiding surfaces 13 and 13' of brake carrier 1. Guiding surfaces 35 and 35' provided at the ribs 31 and 33 are in essence at an angle of 45 degrees to guiding surfaces 34 and 34' and cooperate with the correspondingly aligned guiding surfaces 14 and 14' of brake carrier 1. Guiding surfaces 36 and 36' also provided in ribs 31 and 33 are in a plane vertical with respect to guiding surfaces 34 and 34' and cooperate with guiding surfaces 15 and 15' of brake carrier 1.

In order to keep brake caliper 16 in resilient abutment with brake carrier 1, a spring 37 is fastened in two bores in brake carrier 1, the spring acting with its central leg radially outwardly relative to the axis of the brake disc on brake cylinder 20. By this means, brake caliper 16, at the points X and Y of engagement with guiding surfaces 35 and 35' at the radially inner ribs 31 and 33, comes to rest against guiding surfaces 14 and 14' at guiding pilots 11 and 12 which straddle the ribs 31 and 33 radially from the outside. Simultaneously, brake caliper 16, at the points V and W of engagement with its guiding surfaces 34 and 34' at radially outer ribs 30 and 32, is pressed against guiding surfaces 13 and 13' at guiding pilots 9, 10 of brake carrier 1. If spring 37 breaks, brake caliper 16 is prevented from becoming detached from brake carrier 1 due to ribs 30 and 32 straddling guiding pilots 11 and 12 in the area of the engagement points X and Y from above, as well as due to ribs 31 and 33 straddling guiding pilots 9 and 10 in the area of the engagement points V and W from below.

Within the area of the engagement points V and W, guiding surfaces 36 and 36', together with guiding surfaces 15 and 15', provide for the necessary support of brake caliper 16 in a peripheral direction relative to brake disc 4. These guiding surfaces transfer also the peripheral forces imparted to brake caliper 16 by brake shoe 21. Owing to the position of guiding surfaces 36 and 36' which are radially outside the lines of application of the resultant of the peripheral forces which act on brake shoe 21, there is achieved that during braking guiding surfaces 34 and 34' of brake caliper 16 remain in abutment with brake carrier 1. By virtue of the radial distance between the line of application of the resultant peripheral forces and guiding surface 36, which during clockwise rotation of brake disc 4 according to FIG. 3 transmits the peripheral force to brake carrier 1, a torque becoming active at brake caliper 16 which is directed anti-clockwise. Because the friction force between guiding surfaces 36 and 15 cannot be overcome by the torque, this torque causes guiding surfaces 34' and 13' to be more firmly pressed onto one another at the engagement point W. With this arrangement, when initiating the braking process, brake caliper 16 is not allowed to be lifted off its guiding surfaces owing to the forces which become suddenly active. This avoids the occurrence of brake chatter or rattling.

The statically determined guiding of brake caliper 16 is obtained by aligning caliper 16 only in a radial and tangential direction which is achieved by the design of the guiding members at the engagement points V and W. Only by the design of the guiding members at the engagement points X and Y is the brake caliper aligned also in the direction of the brake-disc axis. With this arrangement, it is possible to obtain an even abutment of brake caliper 16 on the guiding surfaces of brake carrier 1 at all four engagement points, even if manufactured to very large tolerances. It is naturally a prerequisite that the surface portions at brake caliper 16 or brake carrier 1 adjacent to the guiding surfaces are sufficiently spaced apart from one another so that the adjustability of brake caliper 16 is not impaired.

The inventive design of the guiding arrangement of brake caliper 16 which is slidably mounted on brake carrier 1 is equally advantageous for any type of floating-caliper brake. Regarding the usability of this invention, it is irrelevant whether the brake shoes are directly supported in brake carrier 1 or through brake caliper 16. The invention affords advantages also in disc brakes in which brake cylinder 20 is integrally formed with brake carrier 1.

Resilient means 37 urging brake caliper 16 against brake carrier 1 may act upon caliper 16 also radially from the outside. If resilient means 37 is designed in this way, it will be advantageous for brake caliper 16, unlike the embodiment shown, to rest on the guiding surfaces of brake carrier 1 radially from the outside, and for resilient means 37 to act between the guiding members at brake caliper 16.

Owing to the ball-shaped or curved design of the guiding surfaces, a reduction in the contact areas between brake caliper 16 and brake carrier 1 is achieved which makes the brake even less sensitive to corrosion.

While we have described above the principles of our invention in connection with specific apparatus it is to be clearly understood that this description is made only by way of example and not as a limitation to the scope of our invention as set forth in the objects thereof and in the accompanying claims.

We claim:

1. A spot-type disc brake comprising:
   a rotating brake disc having an axis of rotation;
   a fixed brake carrier to receive braking torque embracing said disc;
   a pair of brake shoes, one of said pair of brake shoes being disposed on one side of said disc and the other of said pair of brake shoes being disposed on the other side of said disc, said one of said pair of brake shoes being guided and supported in an opening of said carrier;
   a brake caliper embracing the edge of said disc supports said other of said pair of brake shoes and transmits an actuating force of an actuating device disposed on said one side of said disc directly to said one of said pair of brake shoes and indirectly to said other of said pair of brake shoes; and
   a slidable guiding arrangement slidably connecting said caliper with said carrier parallel to said axis;
   said arrangement including
      a pair of grooves in said caliper parallel to said axis, one of said pair of grooves being spaced in one direction from said axis and the other of said pair of grooves being spaced in a direction opposite said one direction from said axis,
      two pairs of spaced guide members carried by said carrier, a first pair of said spaced guide members engaging said one of said pair of grooves and a second pair of said spaced guide members engaging said other of said pair of grooves,
      each of said pair of grooves having a first guide surface lying in a common plane tangential to the outer circumference of said disc, a second guide surface extending from and perpendicular to said first guide surface and a third guide surface extending from said second guide surface and lying substantially at an angle of 45° with respect to said first guide surface, and
      resilient means engaging said carrier and said actuating device remote from said grooves and said guide members to keep said two pairs of spaced guide members in engagement with said first and third guide surfaces at locations spaced from one another in the direction of said axis;
   one guide member of each of said first and second pairs of said spaced guide members, at a first pair of points of engagement, rests against said first guide surface;
   the other guide member of each of said first and second pairs of said spaced guide members, at a second pair of points of engagement adjacent said actuating device, rests against said third guide surfaces; and
   the portions of said caliper and said carrier adjacent said first, second and third guide surfaces are spaced from one another at a distance to not impair the alignment of said caliper in said arrangement.

2. A brake according to claim 1, wherein said carrier embraces the outside of said caliper.

3. A brake according to claim 1, wherein each of said pair of grooves are disposed in a central portion of said caliper.

4. A brake according to claim 1, wherein
   each of said second guide surfaces are formed by a front surface of ribs formed by an associated one of said pair of grooves.

5. A brake according to claim 1, wherein
   each of said pair of grooves have a trapezoidal cross section.

6. A brake according to claim 1, wherein
   said first pair of points of engagement and said second pair of points of engagement are spaced from one another at a great distance from said axis.

7. A brake according to claim 1, wherein
   guiding of said caliper at one of said first and second pair of points of engagement closest to said other of said pair of brake shoes takes place on said first guide surface.

8. A brake according to claim 7, wherein
   said caliper is urged by said resilient means radially against an associated one of said two pairs of spaced guide members, and
   said first and second guide surfaces lie, at said one of said first and second pair of points of engagement, radially outside the line of action of the circumferential force acting upon said other of said pair of brake shoes.

9. A brake according to claim 1, wherein
   one of said first and second pairs of points of engagement lie on one side of said disc and the other of said first and second pairs of points of engagement lie on the other side of said disc.

* * * * *